United States Patent
Yoon et al.

(10) Patent No.: US 10,823,994 B2
(45) Date of Patent: Nov. 3, 2020

(54) DISPLAY APPARATUS

(71) Applicant: SAMSUNG ELECTRONICS CO., LTD., Suwon-si (KR)

(72) Inventors: Tae Youn Yoon, Hwaseong-si (KR); Myeong Gil Kim, Suwon-si (KR); Dong Jin Lee, Hwaseong-si (KR); Hyun Jun Jung, Yongin-si (KR); Jong Hee Han, Yongin-si (KR); Kwang Hyuck So, Seongnam-si (KR); Jae Wook Yoo, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 15/693,694

(22) Filed: Sep. 1, 2017

(65) Prior Publication Data
US 2018/0143481 A1 May 24, 2018

Related U.S. Application Data

(60) Provisional application No. 62/382,380, filed on Sep. 1, 2016.

(30) Foreign Application Priority Data

Dec. 28, 2016 (KR) .................. 10-2016-0181135

(51) Int. Cl.
*G02F 1/1333* (2006.01)
*G06F 1/16* (2006.01)
*F21V 8/00* (2006.01)

(52) U.S. Cl.
CPC ...... *G02F 1/133308* (2013.01); *G06F 1/1601* (2013.01); *G06F 1/1637* (2013.01);
(Continued)

(58) Field of Classification Search
CPC ... G02F 1/133308; G02F 2001/133325; G02F 2001/133328; G06F 1/1637; G06F 1/1601
(Continued)

(56) References Cited

U.S. PATENT DOCUMENTS

| | | | | |
|---|---|---|---|---|
| 6,168,124 | B1 * | 1/2001 | Matsuoka | F16M 11/10 248/176.1 |
| 6,409,134 | B1 * | 6/2002 | Oddsen, Jr. | F16M 11/10 248/274.1 |

(Continued)

FOREIGN PATENT DOCUMENTS

| KR | 10-0520059 | 10/2005 |
|---|---|---|
| KR | 10-1148064 | 5/2012 |

(Continued)

OTHER PUBLICATIONS

International Search Report dated Dec. 14, 2017, in corresponding International Patent Application No. PCT/KR2017/009407, 3 pgs.
(Continued)

*Primary Examiner* — Nidhi Thaker
(74) *Attorney, Agent, or Firm* — Staas & Halsey LLP

(57) ABSTRACT

A display apparatus includes a frame case to support four sides of a display panel. The frame case is formed by bending a bar-shaped member made of a metal into a rectangular ring shape. Opposite ends of the bar-shaped member facing each other are covered by a cover member, which prevents quality degradation of the appearance of the display.

11 Claims, 10 Drawing Sheets

(52) U.S. Cl.
CPC .......... *G02B 6/0051* (2013.01); *G02B 6/0053* (2013.01); *G02B 6/0068* (2013.01); *G02B 6/0083* (2013.01); *G02B 6/0093* (2013.01); *G02F 2001/133302* (2013.01); *G02F 2001/133317* (2013.01); *G02F 2001/133325* (2013.01); *G02F 2001/133328* (2013.01)

(58) Field of Classification Search
USPC ................ 361/679.24; 248/917–924; 349/58
See application file for complete search history.

(56) References Cited

U.S. PATENT DOCUMENTS

| | | | | |
|---|---|---|---|---|
| 7,126,815 | B2* | 10/2006 | Hwang | F16M 11/105 361/679.06 |
| 7,513,468 | B2* | 4/2009 | Jung | F16M 11/046 248/133 |
| 2003/0227739 | A1* | 12/2003 | Kim | F16M 11/10 361/679.06 |
| 2004/0041961 | A1* | 3/2004 | Lee | G02F 1/133308 349/58 |
| 2004/0047115 | A1* | 3/2004 | Helot | F16M 11/2021 361/679.06 |
| 2006/0158579 | A1* | 7/2006 | Hasegawa | G02F 1/133308 349/58 |
| 2008/0129918 | A1* | 6/2008 | Kim | G02F 1/133308 349/58 |
| 2008/0259542 | A1* | 10/2008 | Juan | G06F 1/1601 361/679.24 |
| 2010/0118225 | A1* | 5/2010 | Lee | G02B 6/0068 349/58 |
| 2010/0164859 | A1 | 7/2010 | Huang | |
| 2016/0249485 | A1 | 8/2016 | Bailey et al. | |

FOREIGN PATENT DOCUMENTS

| | | | |
|---|---|---|---|
| KR | 10-2013-0095708 | | 8/2013 |
| KR | 1020130095708 | * | 8/2013 |
| KR | 10-2014-0017310 | | 2/2014 |
| WO | 2016/085018 A1 | | 6/2016 |

OTHER PUBLICATIONS

Korean Office Action dated Jun. 22, 2020 from Korean Application No. 10-2016-0181135, 13 pages.

* cited by examiner

DISPLAY APPARATUS

CROSS-REFERENCE TO RELATED APPLICATIONS

This application claims the benefit of U.S. Provisional Patent Application No. 62/382,380, filed on Sep. 1, 2016 in the USPTO, and Korean Patent Application No. 10-2016-0181135, filed on Dec. 28, 2016 in the Korean Intellectual Property Office, the disclosures of which is incorporated herein by reference.

BACKGROUND

1. Field

Embodiments of the disclosure relate to a display apparatus including a frame case to support upper, lower, left and right sides of a display panel.

2. Description of the Related Art

A display apparatus displays a screen with received image signals, and includes a television, a monitor and the like.

The display apparatus includes a display unit to display the screen and a stand to support the display unit.

The display unit includes a display panel and a frame case to support four side edges of the display panel.

The frame case is made of a metal to be formed thinly and have sufficient strength, thereby minimizing the width of a bezel.

SUMMARY

An aspect of the present disclosure is to provide a display apparatus having a frame case formed by bending a bar-shaped member such that opposite ends of the bar-shaped member face each other and are not visible.

In accordance with one aspect of the present disclosure, a display apparatus includes a display panel, a frame case having a rectangular ring shape to enclose the display panel, and a cover member coupled to the frame case, wherein the frame case is formed by bending a bar-shaped member made of a metal so that opposite ends of the bar-shaped member face each other, and the cover member covers the opposite ends of the bar-shaped member facing each other.

The opposite ends of the bar-shaped member facing each other may be located on a lower center of the frame case, and the cover member may be coupled to the lower center of the frame case.

The frame case may include a frame portion enclosing the outer side of the display panel, and a support portion extending inward from the frame portion and supporting an outer part of the rear face of the display panel.

The bar-shaped member may be extrusion-molded so as to have a cross-section of a shape corresponding to the frame portion and the support portion.

The cover member may include a cover portion to cover the front of the opposite ends of the bar-shaped member facing each other, and a coupling portion coupled to the frame case.

The cover portion may have a logo formed on the front of the cover portion.

The display apparatus may further include a reinforcing frame coupled to a lower portion of the frame case.

The display apparatus may further include a stand, wherein the stand may include a leg supported on the floor, a neck extending upward from the leg, and neck covers accommodating the neck, wherein the neck may include a wire receiving groove provided on the outside of the neck to receive a wire, and wherein the neck cover may cover the wire receiving groove.

The neck cover may include a front cover and a rear cover coupled to each other in the front-rear direction and the neck may be received between the front cover and a rear cover.

The wire receiving groove may extend vertically on a rear surface of the neck, and an upper end of the wire receiving groove may extend obliquely upward in a radial direction.

The display unit may further include a rear case to form a rear surface of the display unit, wherein the rear case may include a terminal accommodating portion concavely provided on a rear surface of the rear case and having a connection terminal disposed in the terminal accommodating portion, and a terminal cover to cover the terminal accommodating portion, and wherein the terminal cover may include a first wire passing portion to allow passing of a wire.

The front cover may include a second wire passing portion to allow passing of wire, and wherein the rear cover may include a third wire passing portion provided on a lower rear side of the rear cover to allow passing of wire.

In accordance with another aspect of the present disclosure, a display apparatus includes a display unit, and a stand supporting the display unit, wherein the stand includes a leg supported on a floor, a neck extending upward from the leg, and neck covers to accommodate the neck in between, wherein the neck includes a wire receiving groove provided on the outside of the neck to receive the wire, and wherein the neck covers cover the wire receiving groove.

BRIEF DESCRIPTION OF THE DRAWINGS

These and/or other aspects of the disclosure will become apparent and more readily appreciated from the following description of the exemplary embodiments, taken in conjunction with the accompanying drawings, in which.

DESCRIPTION OF THE EMBODIMENTS

Figure 1:
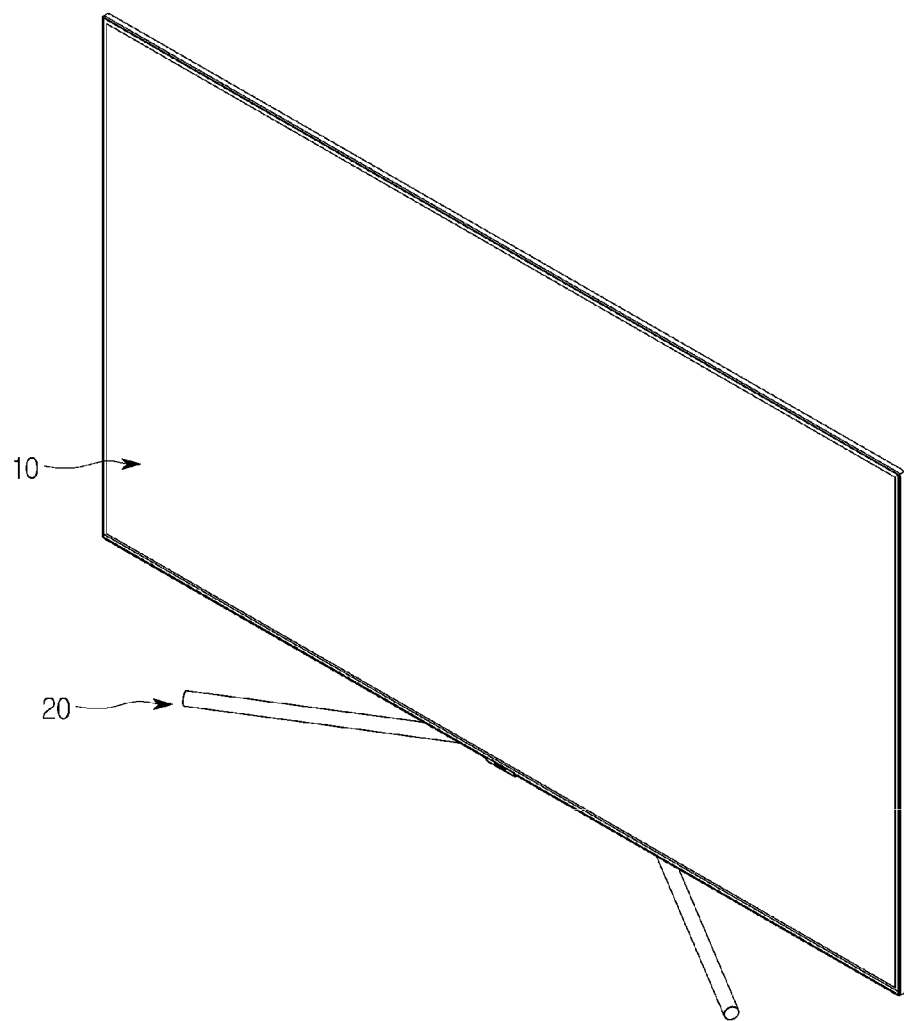
FIG. 1 is a front perspective view illustrating a display apparatus according to an embodiment of the present disclosure.

The present disclosure will be described more fully hereinafter with reference to the accompanying figures, in which exemplary embodiments of the present disclosure are shown. As those skilled in the art would realize, the described embodiments may be modified in various different ways, all without departing from the spirit or scope of the present disclosure.

Parts which are not associated with the description are omitted in order to specifically describe the present disclosure, and like reference numerals refer to like elements throughout the specification The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

It will be understood that, although the terms first, second, third, etc., may be used herein to describe various elements, but elements are not limited by these terms. These terms are only used to distinguish one element from another element. For example, without departing from the scope of the present disclosure, a first element may be termed as a second element, and a second element may be termed as a first element. The term of "and/or" includes a plurality of combinations of relevant items or any one item among a plurality of relevant items.

Hereinafter embodiments of the present disclosure will be described with reference to drawings. In the following detailed description, the terms of "upper side", "lower side", "left side", "right side", "horizontality", "verticality" and the like may be defined by the drawings, but the shape and the location of the component is not limited by the term.

A display apparatus according to an embodiment of the present disclosure will now be described in detail with reference to the accompanying figures.

Figure 2:
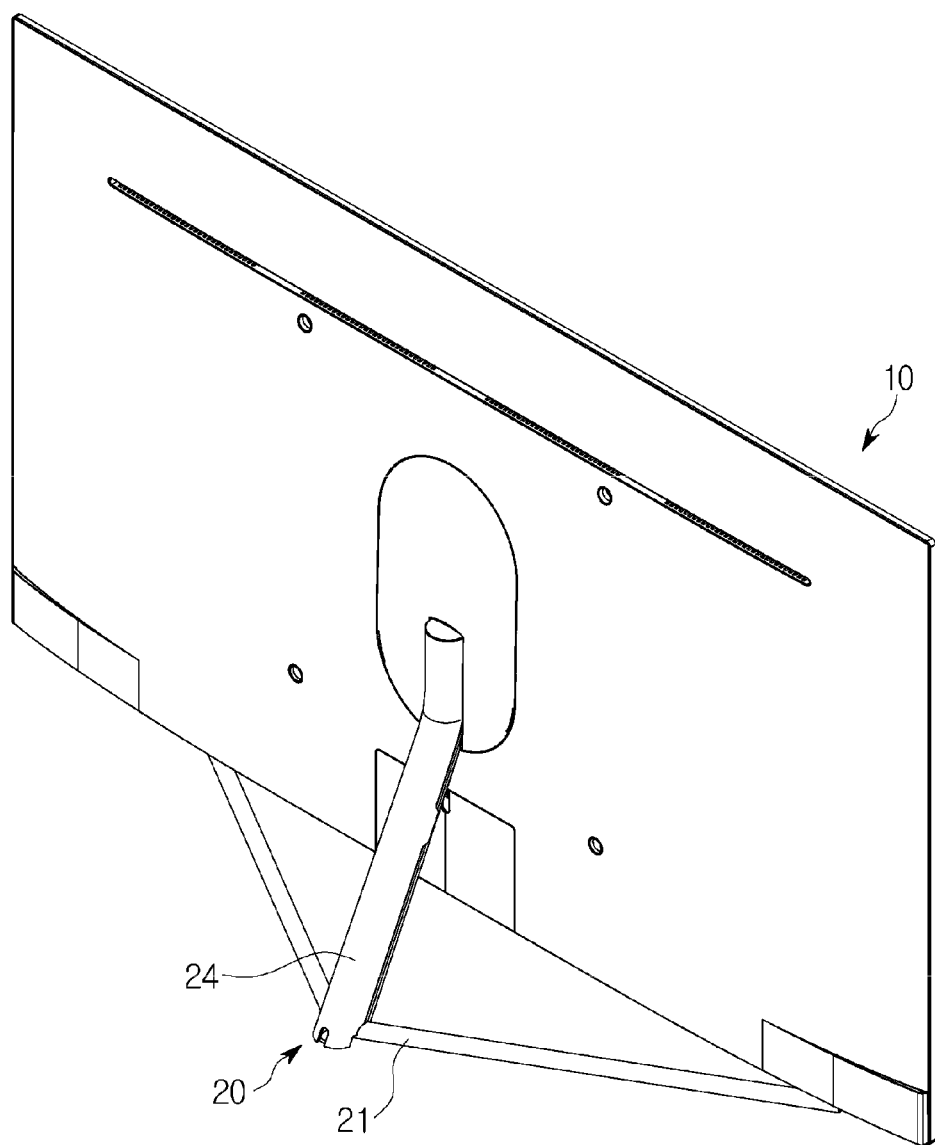
FIG. 2 is a rear perspective view illustrating a display apparatus according to an embodiment of the present disclosure.

Referring to FIGS. 1 and 2, a display apparatus according to an embodiment of the present disclosure includes a display unit 10 and a stand 20 to support the display unit 10.

As shown in FIGS. 2 to 7, the display unit 10 includes a display panel 11 formed of a liquid crystal panel, a backlight 12 disposed on the rear side of the display panel 11 for supplying light to the display panel 11, and optical sheets 13A and 13B disposed between the display panel 11 and the backlight 12 to improve the optical property of the light supplied by the backlight 12.

The display unit 10 includes a bottom chassis 14 to receive and support the backlight 12, a middle mold 15 installed at a lower portion of the bottom chassis 14 to support the optical sheets 13A and 13B, a frame case 16 formed in a substantially rectangular ring shape to support four sides of the display panel 11 and form upper, lower, left and right edges of the display unit 10, and a rear case 17 coupled to a rear side of the frame case 16 and covering the rear side of the bottom chassis 14 to form a rear surface of the display unit 10.

The display panel 11 includes a liquid crystal display panel formed by a pair of glass substrates formed in a rectangular plate shape and liquid crystal disposed between the pair of glass substrates.

The backlight 12 includes a light guide plate 12a formed in a rectangular plate shape, a white reflective sheet 12b disposed on the rear surface of the light guide plate 12a to reflect light, and a light source 12C to generate light.

The light source 12C includes a printed circuit board extending laterally to correspond to a lower end of the light guide plate 12a and a plurality of light emitting diodes disposed on the printed circuit board and laterally spaced apart from each other. The plurality of light emitting diodes generates the light.

The optical sheets 13A and 13B may include a diffuser sheet 13A to receive and diffuse light emitted forward from the light guide plate 21, and a Dual Brightness Enhancement Film (DBEF) sheet 13B disposed on the front side of the diffuser sheet 13A. The DBEF sheet 13B is a high-brightness prism sheet.

The bottom chassis 14 has a box shape with a substantially opened front to accommodate the backlight 12.

The middle mold 15 has a substantially bar shape so as to correspond to the lower portion of the bottom chassis 14 and is coupled to the lower portion of the bottom chassis 14. The middle mold 15 supports lower ends of the optical sheets 13A and 13B. A middle front 15a formed of a metal material is coupled to the front side of the middle mold 15 so that a lower portion of a rear surface of the display panel 11 is supported on the front surface of the middle front 15a. In the present disclosure, the lower portion of the rear surface of the display panel 11 is attached to the middle front 15a through a double-sided tape.

The frame case 16 has a substantially rectangular ring shape so as to surround the outside of the display panel 11. The frame case 16 includes a frame portion 16a that surrounds the outside of the display panel 11 to form a bezel of the display unit 10, a support portion 16b that protrudes inward from the frame portion 16a to support an outer side of a rear surface of the display panel 11. In this disclosure, the support portion 16b extends inward from the upper side and opposite sides of the frame case 16, and outer portions of the upper side and opposite sides of the rear surface of the display panel 11 are attached to the support portion 16b by the double-sided tape.

Recently, a design trend of the display unit 10 is toward minimizing the bezel while adopting the large display panel 11. The frame case 16 is made of a metal material having high strength to support the load of the large display panel 11 while minimizing the bezel.

It is very inefficient in terms of space utilization and cost to manufacture the metal frame case 16 for supporting the large display panel 11 through molding. Therefore, the frame case 16 is formed by extruding a metal to produce a bar-shaped member and then bending the bar-shaped member into a rectangular ring shape.

In the above process of manufacturing the bar-shaped member through the extrusion of a metal, the bar-shaped member has a cross-sectional shape corresponding to the frame portion 16a and the support portion 16b. The support portion 16b arranged on the bar-shaped member extends in the longitudinal direction of the bar-shaped member. Therefore, the frame portion 16a and the supporting portion 16b are formed when the bar-shaped member is bent in a rectangular ring shape to form the frame case 16.

The term "bar-shaped member" is to express a member having thin width and thickness, and extending in a direction to have one-directional length, and the bar-shaped member is not limited to a rectangular cross section or a circular cross section and may have various cross-sectional shapes.

Figure 8:
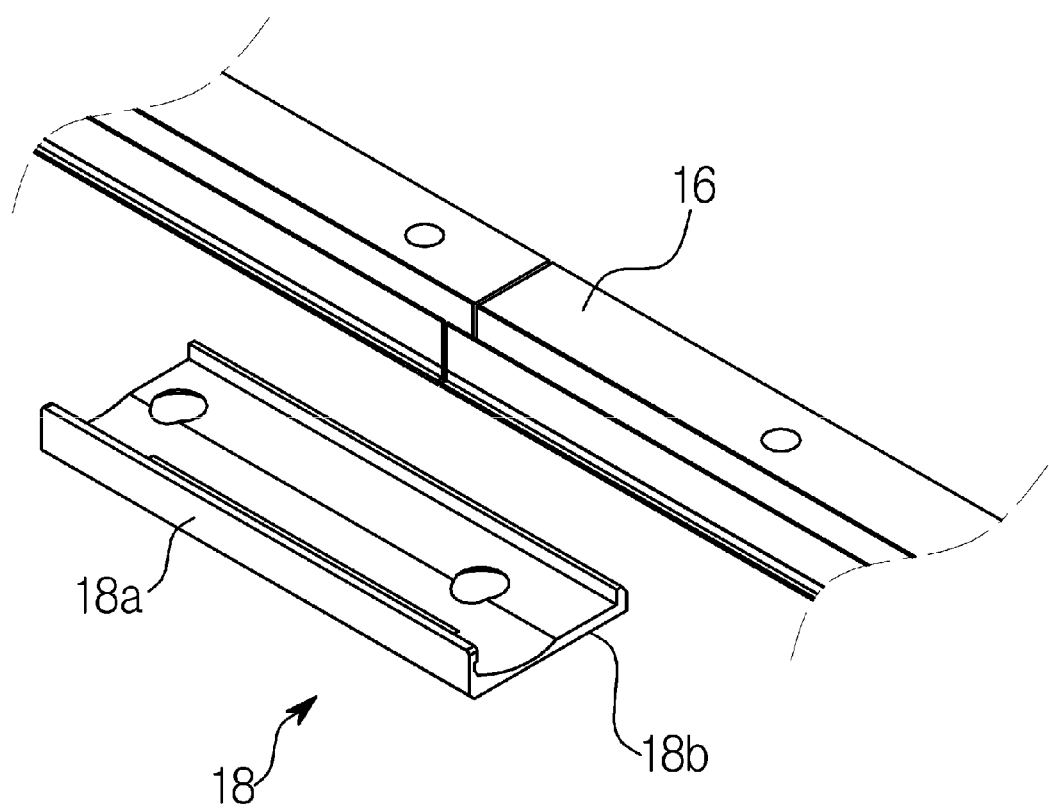
FIG. 8 is a perspective view illustrating installation of a cover member into a frame case in a display apparatus according to an embodiment of the present disclosure.

As described above, since the frame case 16 is formed by bending the bar-shaped member into a rectangular ring shape, the frame case 16 has a portion where opposite ends of the bar-shaped member face each other. Referring to FIG. 8, the bar-shaped member is bent so that the opposite ends face each other at a lower center of the frame case 16.

In this embodiment, the opposite ends of the bar-shaped member are spaced apart from each other and indirectly connected to each other through a reinforcing frame 19 as will be described later. However, the present disclosure is not limited thereto. The opposite ends of the bar-shaped member may be directly connected to each other through welding or an adhesive.

It is preferable that the portion where opposite ends of the bar-shaped member face each other in the frame case 16 is not visible to a user who is viewing the display apparatus in front of the display apparatus. Therefore, a cover member 18 is provided at the lower center of the frame case 16 so as to cover the opposite ends of the bar-shaped member facing each other.

The cover member 18 includes a cover portion 18a to cover the front of the portion where opposite ends of the bar-shaped member face each other, and a coupling portion 18b extending from a lower end of the cover portion 18a to the rear side and coupled to the frame case 16. A product logo or the like may be formed on the front surface of the cover portion 18a so that the cover member 18 is used as a logo plate.

As described above, the portion where opposite ends of the bar-shaped member face each other is formed at the lower center of the frame case 16. Since the opposite ends of the bar-shaped member are not connected to each other, a lower portion of the frame case 16 has strength relatively lower than the other portion. Therefore, a reinforcing frame 19 is coupled to the lower portion of the frame case 16 to support the opposite ends of the bar-shaped member forming the frame case 16 and reinforce the strength of the lower portion of the frame case 16.

The rear case 17 is coupled to the rear side of the frame case 16 to form a rear surface of the display unit 10. The rear case 17 includes a bracket mounting portion 17a concavely provided at an upper portion on the back of the rear case 17 to have a fixing bracket 23 installed therein, as will be described later, and a terminal accommodating portion 17b provided at a lower portion on the back of the rear case 17 with a terminal to which wires are connected. On the front of the bracket mounting portion 17a, a support bracket 17e formed of a metal material and provided at a position corresponding to the fixing bracket 23 is disposed.

The bracket mounting portion 17a is covered by a bracket cover 17c.

The terminal accommodating portion 17b is covered by a terminal cover 17d, and a first wire passing portion 17d-1 having a shape of a concave groove is provided at an upper portion of the terminal cover 17d for the wire to pass through the terminal cover 17d.

Figure 3:
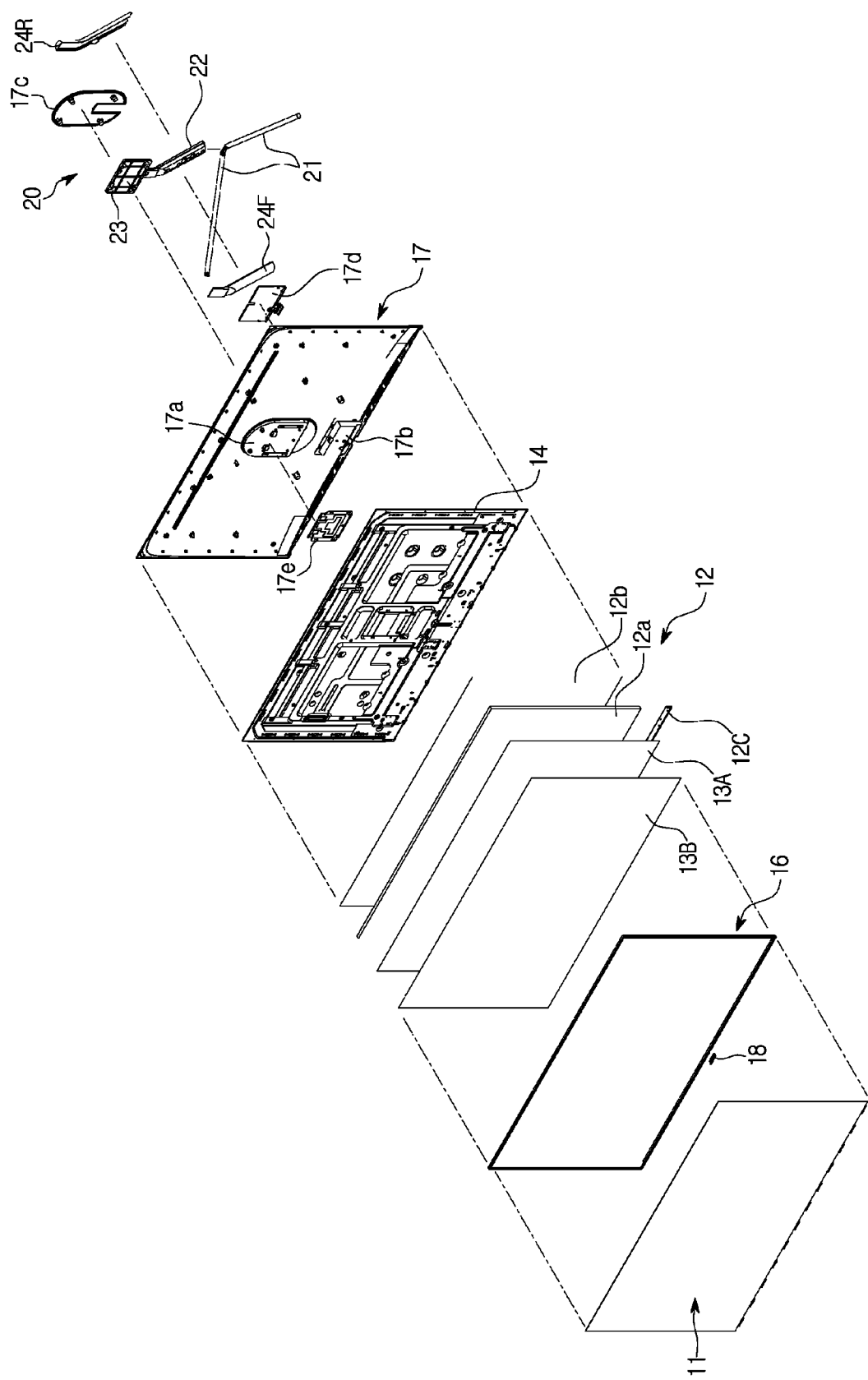
FIG. 3 is a front exploded perspective view illustrating a display apparatus according to an embodiment of the present disclosure.
Figure 4:
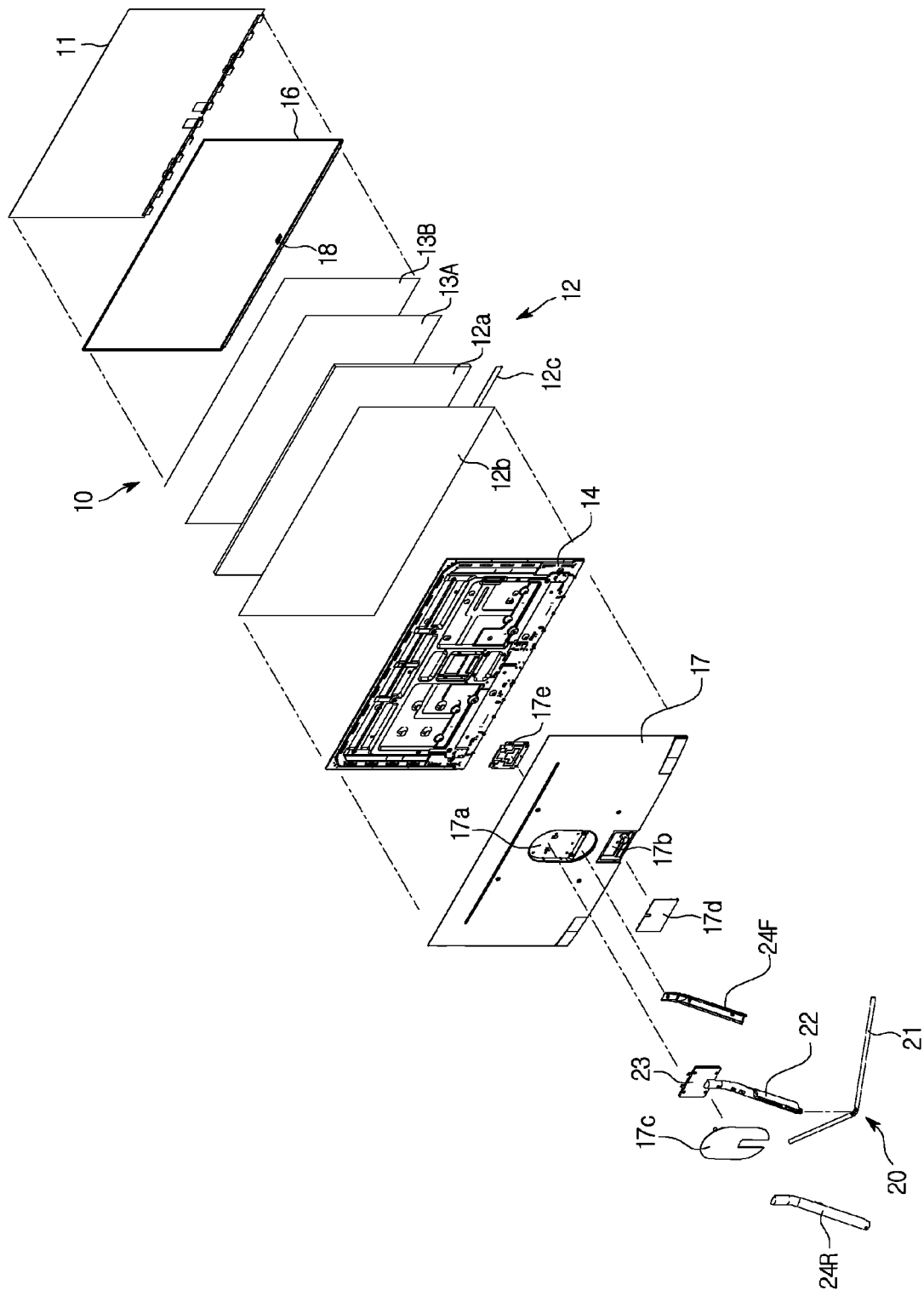
FIG. 4 is a rear exploded perspective view illustrating a display apparatus according to an embodiment of the present disclosure.
Figure 5:
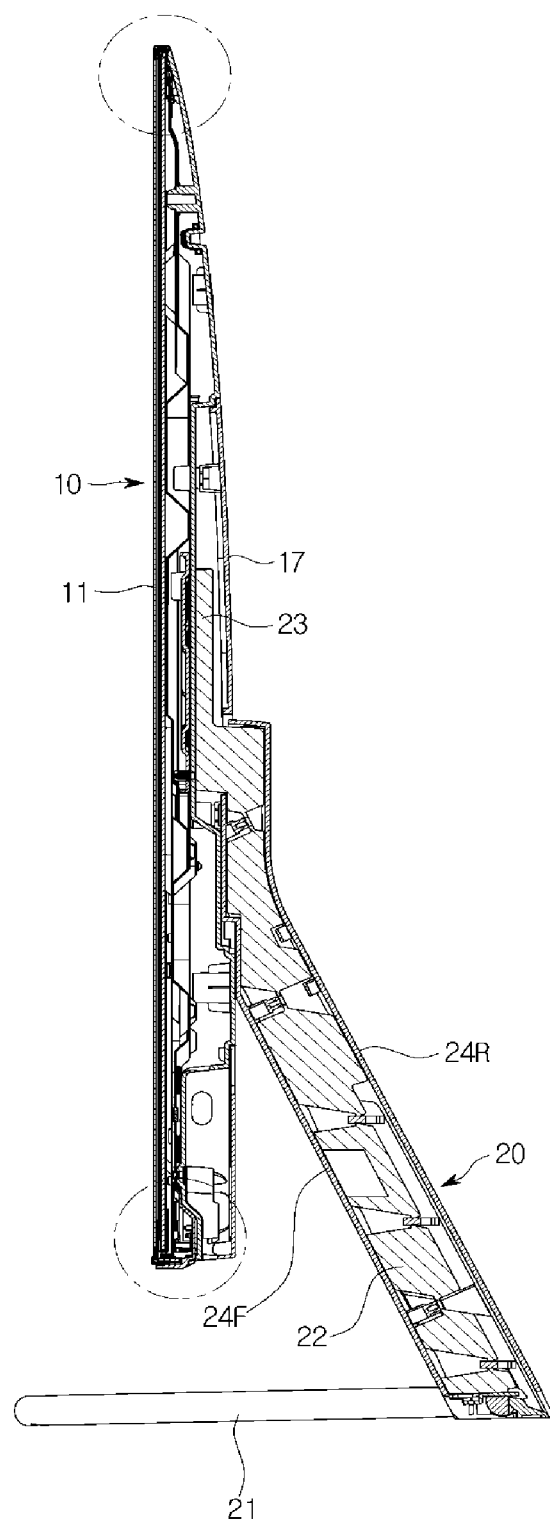
FIG. 5 is a side cross-sectional view illustrating a display apparatus according to an embodiment of the present disclosure.
Figure 6:
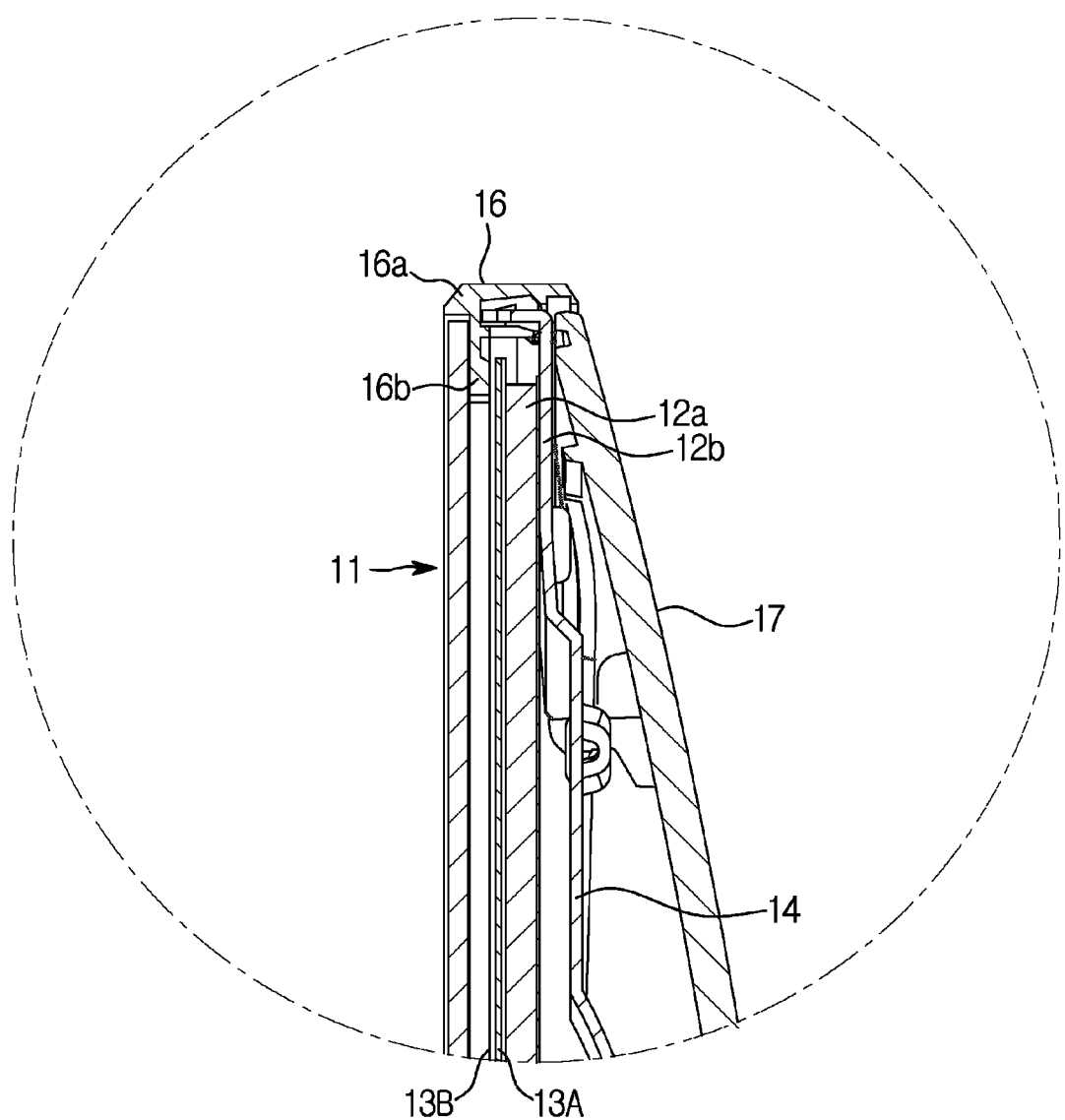
FIG. 6 is a cross-sectional view illustrating an upper portion of a display unit in a display apparatus according to an embodiment of the present disclosure.
Figure 7:
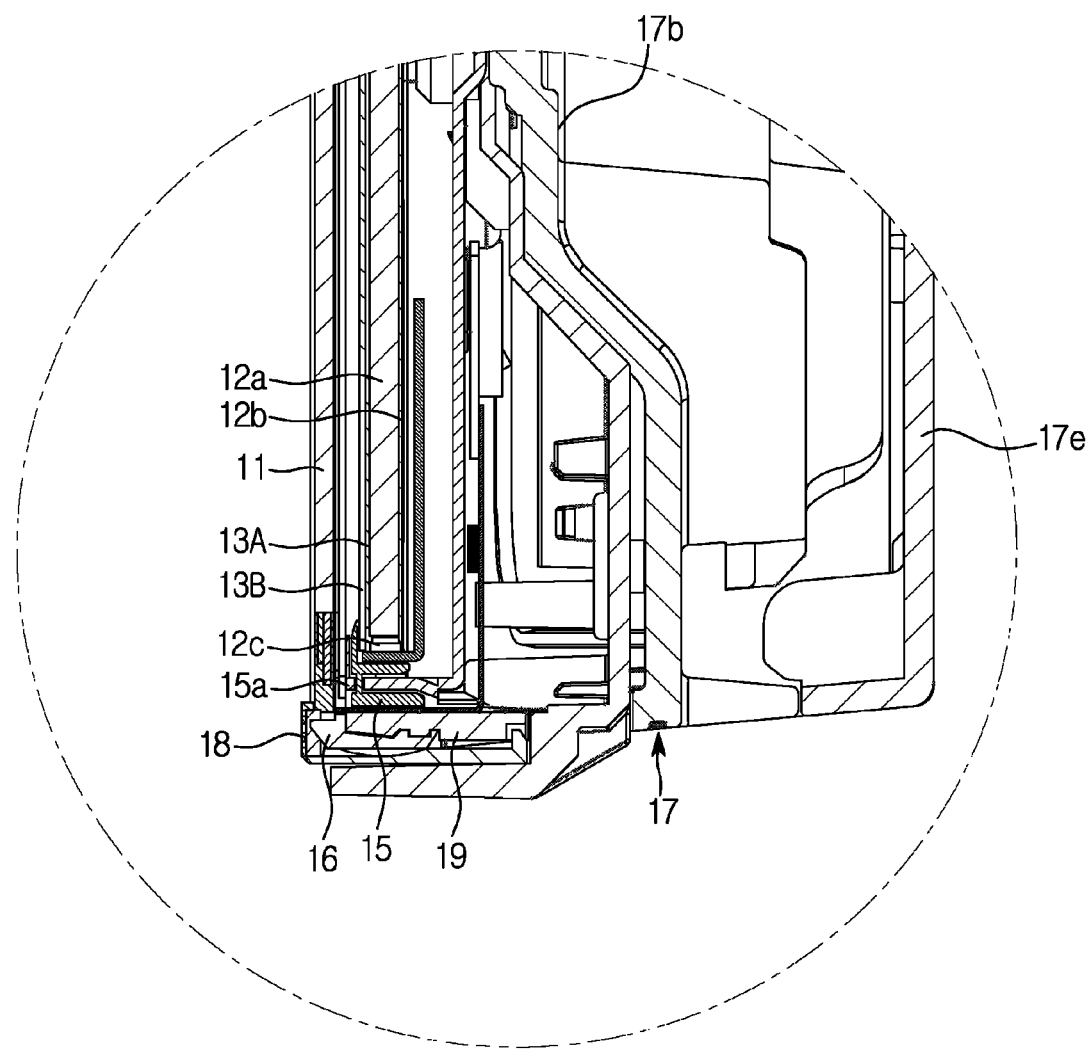
FIG. 7 is a cross-sectional view illustrating a lower portion of a display unit in a display apparatus according to an embodiment of the present disclosure.
Figure 9:
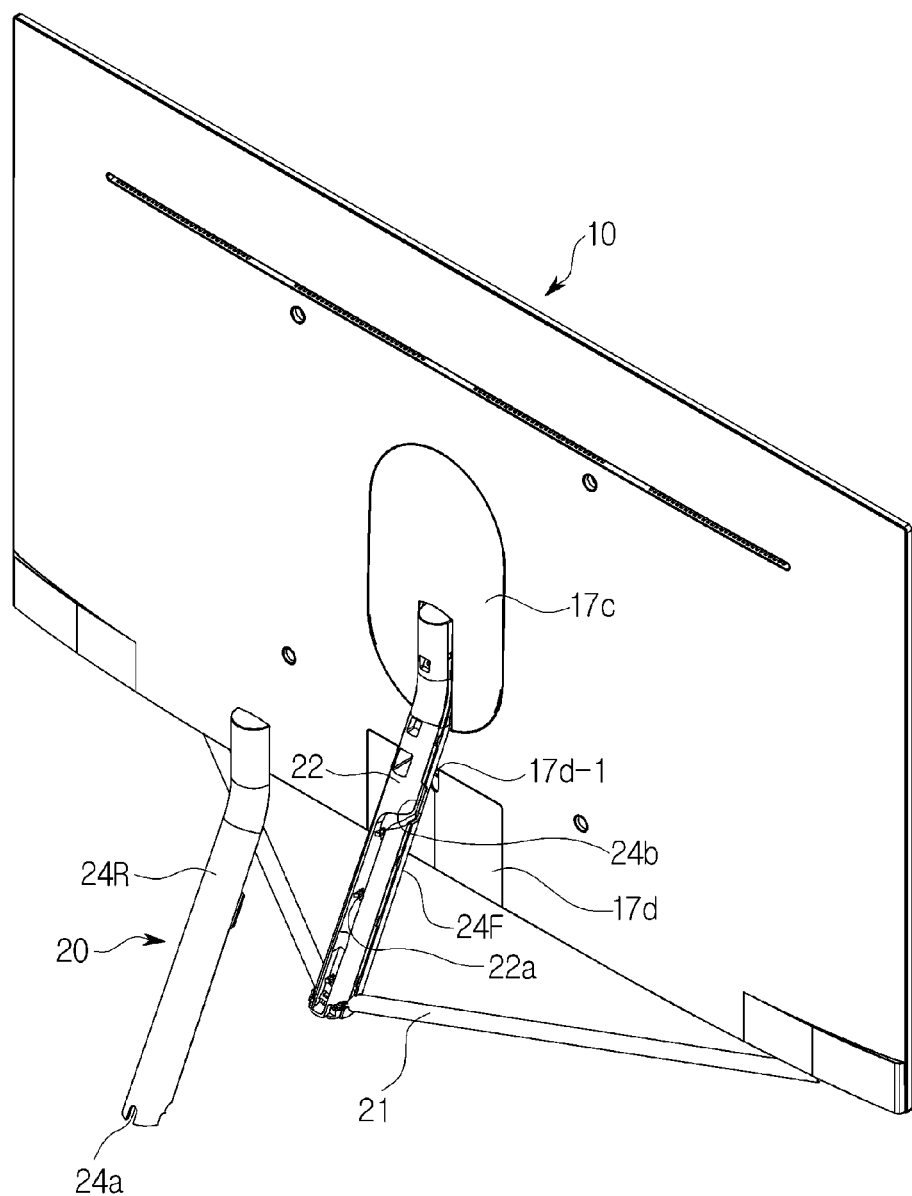
FIGS. 9 and 10 are exploded perspective views illustrating installation of a stand in a display apparatus according to an embodiment of the present disclosure.
Figure 10:
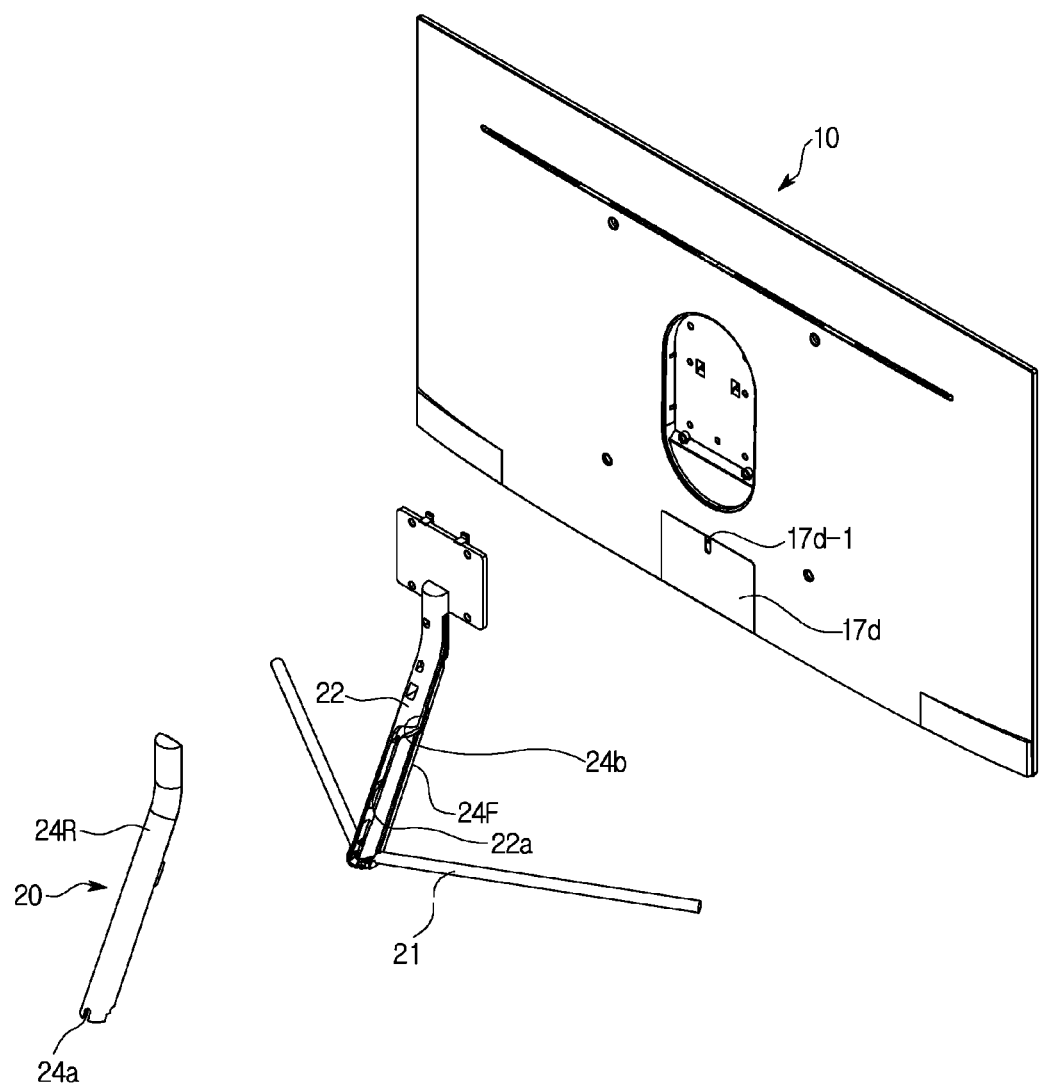

Referring to FIGS. 3, 9 and 10, the stand 20 is supported on the floor. The stand includes a leg 21 extending obliquely toward opposite front sides to form a substantially V-shape, a neck 22 having a lower end installed at the center of the leg 21 and extending obliquely toward a front upper side, a fixing bracket 23 provided at an upper end of the neck 22 and fixed to the bracket mounting portion 17a, and neck covers 24F, 24R to accommodate the neck 22 inside.

The neck 22 includes the neck covers 24F and 24R, which are formed of a metal so as to have sufficient strength, which have the lower ends thereof fixed to the center of the leg 21, and cover a wire receiving groove 22a, which will be described later.

The neck 22 extends obliquely toward a front upper side and includes the wire receiving groove 22a to receive the wire. The wire receiving groove 22a extends vertically on the rear surface of the neck 22, and the upper end of the wire receiving groove 22a extends obliquely upward in a radial direction.

The neck covers 24F and 24R include a front cover 24F and a rear cover 24R which are coupled to each other in a front-rear direction to receive the neck. Since the front cover 24F and the rear cover 24R accommodate the neck 22, the electric wire receiving groove 22a and the electric wires accommodated in the electric wire receiving groove 22a are covered by the front cover 24F and the rear cover 24R.

The front cover 24F includes a second wire passing portion 24b provided in the center of the upper end and having a shape of a concave groove to allow the wire to pass, and the rear cover 24R includes a third wire passing portion 24a provided in the lower end and having a shape of a concave groove to allow the wire to pass. Therefore, a portion of the wire may be disposed inside the neck covers 24F and 24R.

Therefore, the wire connected to the terminal accommodating portion 17b is exposed to the outside in a short potion between the first wire passing portion 17d-1 and the second wire passing portion 24b and in the outside of the third wire passing portion 24a, and most of the wire is received in and covered by the neck 22. Thus, an exposed portion of the wire is minimized, which improves the appearance of the rear side of the display apparatus.

In this embodiment, the opposite ends of the bar-shaped member forming the frame case 16 meet at the lower center of the frame case 16, but this is merely an example. For example, the opposite ends of the bar-shaped member may meet at the upper center of the frame case.

Depending on the design of the display apparatus, the opposite ends of the bar-shaped member may meet each other not only at the lower center of the frame case but at any different position. Even in the case of different positions of the opposite ends of the bar-shaped member, the opposite ends of the bar-shaped may be covered by the cover member.

As is apparent from the above, the display apparatus according to the present disclosure may have a frame case formed by bending the bar-shaped member made of a metal into a rectangular ring shape and a portion where opposite ends of the bar-shaped member face each other covered by a cover member. This may avoid quality degradation of the appearance of the display apparatus that might be caused by exposure of the portions where the both ends face each other.

The present disclosure is not limited to the embodiment described above, and it should be clear to those skilled in the art that various changes and modifications thereto are possible without departing from the spirit and scope of the present disclosure. Therefore, the changes and modifications fall within the scope of the appended claims of the present disclosure.

What is claimed is:

1. A display apparatus comprising:
 a display panel;
 a frame case having a rectangular ring shape to cover outer end portions of a front surface of the display panel; and a cover member coupled to the frame case,
wherein the frame case comprises a bar-shaped member made of a metal bent so that opposite ends of the bar-shaped member face each other,
the cover member covers the opposite ends of the bar-shaped member facing each other, and includes a cover portion extending in a direction parallel to the display screen and covering a portion of the frame case adjacent to the ends of the bar-shaped member, and a coupling portion extending from the cover portion across a bottom of the frame case and partially up a back of the frame case, the cover portion to cover the opposite ends of the bar-shaped member facing each other at a front of the frame case and the coupling portion coupled to the bottom of the frame case.

2. The display apparatus according to claim 1, wherein
the opposite ends of the bar-shaped member are located on a lower center of the frame case, and
the cover member is coupled to the lower center of the frame case.

3. The display apparatus according to claim 2, further comprising a reinforcing frame coupled to a lower portion of the frame case.

4. The display apparatus according to claim 1, wherein the frame case comprises:
a frame portion enclosing an outer side of the display panel; and
a support portion extending inward from the frame portion and supporting an outer part of a rear face of the display panel.

5. The display apparatus according to claim 4, wherein the bar-shaped member is extrusion-molded and has a cross-section of a shape corresponding to the frame portion and the support portion.

6. The display apparatus according to claim 1, wherein the cover portion has a logo formed on a front of the cover portion.

7. The display apparatus according to claim 1, further comprising a stand,
wherein the stand further includes a leg and a neck,
the leg is supported on a floor when the display apparatus is placed on the floor,
the neck extends upward from the leg, and
a wire receiving groove is provided on an outside of the neck to receive a wire.

8. The display apparatus according to claim 7, further comprising
a front cover and a rear cover coupled to each other in a front-rear direction,
wherein the neck is received between the front cover and the rear cover.

9. The display apparatus according to claim 7, wherein
the wire receiving groove extends vertically on a rear surface of the neck, and
an upper end of the wire receiving groove extends obliquely upward in a radial direction.

10. The display apparatus according to claim 7, further comprising a rear case to form a rear surface of the display apparatus,
wherein the rear case includes a terminal accommodating portion, a connection terminal, and a terminal cover,
the terminal accommodating portion is concavely provided on a rear surface of the rear case,
the connection terminal is disposed in the terminal accommodating portion, and
the terminal cover covers the terminal accommodating portion, and
wherein the terminal cover includes a first wire passing portion configured to allow passing of a wire.

11. The display apparatus according to claim 10, wherein a front cover includes a second wire passing portion configured to allow passing of wire, and
wherein a rear cover includes a third wire passing portion provided on a lower rear side of the rear cover configured to allow passing of wire.

* * * * *